United States Patent
Yagi et al.

(10) Patent No.: US 12,123,884 B2
(45) Date of Patent: Oct. 22, 2024

(54) MONITORING THE CLEANING STATUS OF AN AUTOMATIC ANALYZER

(71) Applicant: HITACHI HIGH-TECH CORPORATION, Tokyo (JP)

(72) Inventors: Kenichi Yagi, Tokyo (JP); Masafumi Miyake, Tokyo (JP); Sayaka Asada, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 890 days.

(21) Appl. No.: 17/276,937

(22) PCT Filed: Nov. 14, 2019

(86) PCT No.: PCT/JP2019/044679
§ 371 (c)(1),
(2) Date: Mar. 17, 2021

(87) PCT Pub. No.: WO2020/121726
PCT Pub. Date: Jun. 18, 2020

(65) Prior Publication Data
US 2022/0034923 A1   Feb. 3, 2022

(30) Foreign Application Priority Data

Dec. 11, 2018   (JP) ................................ 2018-231519

(51) Int. Cl.
*G01N 35/00* (2006.01)
*G01N 35/04* (2006.01)

(52) U.S. Cl.
CPC . *G01N 35/00693* (2013.01); *G01N 35/00623* (2013.01); *G01N 35/04* (2013.01);
(Continued)

(58) Field of Classification Search
CPC ....... G01N 35/00693; G01N 35/00623; G01N 35/04; G01N 2035/00891; G01N 2035/0437
(Continued)

(56) References Cited

U.S. PATENT DOCUMENTS 6,019,945 A * 2/2000 Ohishi ................. G01N 35/026
422/65
6,080,364 A * 6/2000 Mimura ............... G01N 35/026
422/65
(Continued)

FOREIGN PATENT DOCUMENTS

JP   2008-51765 A    3/2008
JP   2009-270869 W   11/2009
(Continued)

OTHER PUBLICATIONS

International Search Report of PCT/JP2019/044679 dated Dec. 17, 2019.
(Continued)

*Primary Examiner* — Arlen Soderquist
(74) *Attorney, Agent, or Firm* — MATTINGLY & MALUR, PC

(57) ABSTRACT

An automatic analyzer is capable of normally maintaining a device condition and exhibiting a stable performance by automatically monitoring a cleaning implementation situation using a wash rack. The automatic analyzer includes an analysis unit, a rack loading unit into which at least a sample rack that holds the sample and a wash rack that holds a cleaning liquid are loaded. A transportation mechanism transports the sample rack and the wash rack to the analysis unit. A management control unit causes the wash rack to be transported to an analysis unit, causes a cleaning operation of the analysis unit by the cleaning liquid held by the wash rack, and causes stopping of the sample analysis operation
(Continued)

of the analysis unit to which the wash rack has been transported until a performance of the analysis unit is determined to be normal based on the cleaning operation.

11 Claims, 12 Drawing Sheets

(52) U.S. Cl.
CPC .............. *G01N 2035/00891* (2013.01); *G01N 2035/0437* (2013.01)

(58) Field of Classification Search
USPC .......................................................... 422/67
See application file for complete search history.

(56) References Cited

U.S. PATENT DOCUMENTS

| | | | | |
|---|---|---|---|---|
| 6,117,683 | A * | 9/2000 | Kodama | G01N 35/04 422/65 |
| 6,319,718 | B1 * | 11/2001 | Matsubara | G01N 35/1065 422/62 |
| 6,579,717 | B1 * | 6/2003 | Matsubara | G01N 35/026 198/349.5 |
| 2004/0253146 | A1 * | 12/2004 | Shiba | G01N 35/00663 422/64 |
| 2005/0175506 | A1 | 8/2005 | Matsubara et al. | |
| 2005/0207938 | A1 * | 9/2005 | Hanawa | G01N 35/1002 422/64 |
| 2011/0104810 | A1 * | 5/2011 | Shiba | G01N 35/1002 422/67 |
| 2011/0236990 | A1 * | 9/2011 | Mizutani | G01N 33/5304 422/62 |
| 2012/0253693 | A1 | 10/2012 | Inomata et al. | |
| 2014/0250339 | A1 * | 9/2014 | Ishii | G01N 35/00623 714/57 |
| 2015/0241458 | A1 * | 8/2015 | Pollack | G01N 35/00732 700/230 |
| 2019/0383842 | A1 * | 12/2019 | Saito | B01L 3/52 |

FOREIGN PATENT DOCUMENTS

| | | |
|---|---|---|
| JP | 2012-208099 A | 10/2012 |
| JP | 2014-16218 A | 1/2014 |

OTHER PUBLICATIONS

Extended European Search Report received in corresponding European Application No. 19894674.1 dated Aug. 1, 2022.

* cited by examiner

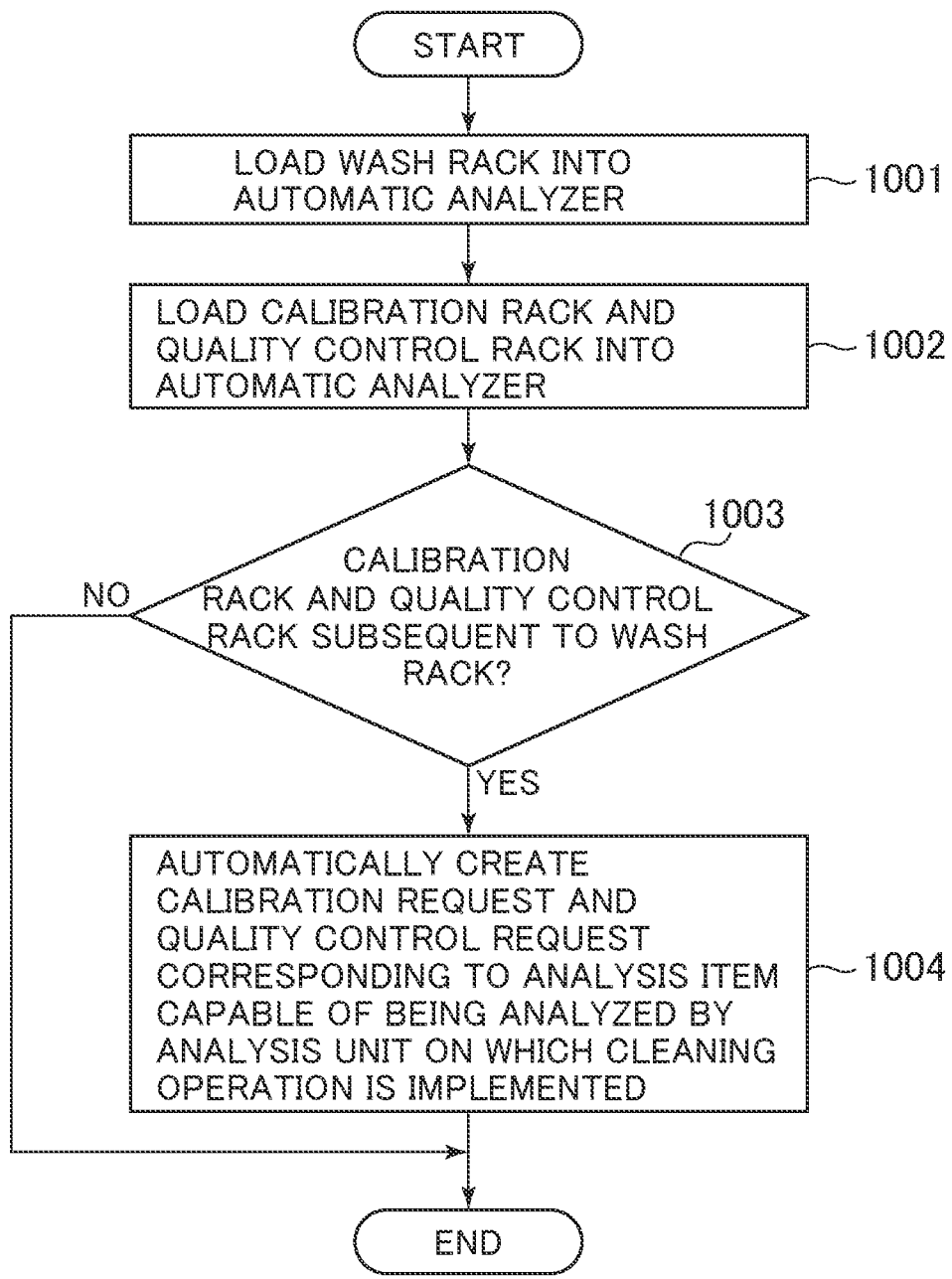

MONITORING THE CLEANING STATUS OF AN AUTOMATIC ANALYZER

TECHNICAL FIELD

The present invention relates to an automatic analyzer that performs qualitative and quantitative analysis of biological samples such as blood and urine.

BACKGROUND ART

In order to ensure the performance of the automatic analyzer, it is important to keep a device condition of the automatic analyzer constant.

One of the methods for keeping the device condition constant is to regularly clean the mechanical parts related to the analysis. Various cleaning methods have been proposed. As one of the methods, there is a method in which a sample container is filled with a cleaning solution necessary for cleaning, and the sample container is installed on a sample rack and transported to the automatic analyzer so that a cleaning operation of a necessary part is implemented in the automatic analyzer (hereinafter, refer to the above rack as a wash rack).

While the maintenance is performed by the wash rack to maintain the device condition, the device condition may change by implementing the maintenance.

For example, when the cleaning maintenance of a dispensing mechanism for dispensing a sample is performed, various components including dirt adhering to a sample dispensing probe are removed due to the cleaning effect. As a result, the condition of the sample dispensing probe is improved, but the condition of the sample dispensing probe changes compared to the condition before the maintenance.

As a result, there is a possibility that the measurement result may be affected before and after the cleaning maintenance. Also, there is a possible that the cleaning solution used during cleaning may remain on the sample dispensing probe, which may affect the measurement results.

On the other hand, cleaning using the wash rack is an important maintenance for keeping the device condition constant, and the cleaning is required to be carried out according to a period recommended for the device.

However, maintenance by the wash rack requires a preparatory operation by a user, so that the user may neglect to carry out this maintenance. In that case, cleaning of the required part is not performed within the period recommended for the device, and there is a concern that the device condition may deteriorate.

A diversity of methods have been proposed as methods for dealing with changes in the device condition.

Patent Literature 1 discloses a calibration necessity determination unit for determining whether or not calibration of a calibration curve of an analysis item is necessary based on an analysis parameter when the analysis parameter used for the measurement is set. The calibration necessity determination unit sets a calibration invalid flag of the analysis item determined to require calibration of the calibration curve, and the analysis for the analysis item is not performed.

Patent Literature 2 discloses a technique for automatically recommending a recalibration setting request for the analysis item due to a change in an index (parameter) that affects the calibration curve data. Specifically, when the index (parameter) has been changed, the existence of the corresponding calibration curve data is confirmed to determine the necessity of recalibration, and the determination is stored in the device as a recalibration recommended information, and prompts the user to measure the calibration again.

Patent Literature 3 discloses a technique described above. When a pipette of the dispensing unit has been cleaned, there is a risk that accurate analysis results cannot be obtained due to contamination, and "pipette cleaning" may include an uncertainty factor. Therefore, in order to reduce the uncertainty due to the pipette cleaning, information that "check the measurement results and quality control results before and after pipette cleaning." is registered in "an uncertainty information database D B301".

PRIOR ART LITERATURE

Patent Literature

Patent Literature 1: Japanese Patent Application Publication No. 2008-51765
Patent Literature 2: Japanese Patent Application Publication No. 2014-16218
Patent Literature 3: Japanese Patent Application Publication No. 2012-208099

SUMMARY OF THE INVENTION

Problem to be Solved by the Invention

As one method for resolving a mutation in the device condition of the automatic analyzer, there is a method of reconfirming the device performance by recalibration of the device and measurement of the quality control sample by performing calibration again in the device environment where the device condition is mutated due to the maintenance.

However, since the cleaning operation is performed by putting the rack into the automatic analyzer, the wash rack can perform the cleaning operation even during a routine analysis. As a result, even if the device condition changes due to the maintenance by the wash rack, the user cannot recognize this mutation during the routine analysis, so that the possibility that the routine analysis is continued, the calibration is not performed, and the measurement result is obtained is conceivable.

Further, in the techniques disclosed in Patent Literature 1 and Patent Literature 2, recalibration is obtained with a change of analysis parameters, which is one of the factors affecting the analysis as a trigger, and it is difficult for the user to recognize the change in the device condition due to the cleaning operation using the wash rack during the routine analysis.

Further, the technique disclosed in Patent Literature 3 prompts the user to confirm the measurement result and the quality control result when there is a possibility of contamination due to cleaning, but even after cleaning with the wash rack where the device condition may change, since the user cannot recognize this mutation during the routine analysis, so that the routine analysis may continue, and the calibration may not be performed, which may affect the measurement results.

An object of the present invention is to realize an automatic analyzer capable of maintaining a normal device condition and exhibiting stable performance by automatically monitoring a cleaning execution status using a wash rack.

Means for Solving Problems

The present invention is configured as follows in order to achieve the above object.

An automatic analyzer includes: at least one analysis unit that analyzes a sample; a rack loading unit into which at least a sample rack that holds the sample and a wash rack that holds a cleaning liquid are loaded; a transportation mechanism that transports at least the sample rack and the wash rack loaded to the rack loading unit to the analysis unit; and an overall management control unit that controls operations of the analysis unit, the rack loading unit, and the transportation mechanism, in which the overall management control unit causes the wash rack to be transported to the analysis unit, causes the analysis unit to execute cleaning operation of the analysis unit to which the wash rack has been transported by the cleaning liquid held by the wash rack, calibration analysis and measurement of a quality control sample, and stops sample analysis operation of the analysis unit to which the wash rack has been transported until a performance of the analysis unit is determined to be normal.

Effects of the Invention

The automatic analyzer capable of maintaining the normal device condition and exhibiting stable performance can be realized by automatically monitoring the cleaning execution status using the wash rack.

BRIEF DESCRIPTION OF THE DRAWINGS

FIG. 12 is a diagram showing a processing flow for automatically generating a request for calibration analysis and a request for measuring a quality control for all items capable of being analyzed by an analysis unit according to a fifth embodiment.

MODE FOR CARRYING OUT THE INVENTION

An example of an automatic analyzer including multiple analysis units will be described according to an embodiment of the present invention.

EXAMPLE

Example 1

Figure 1:
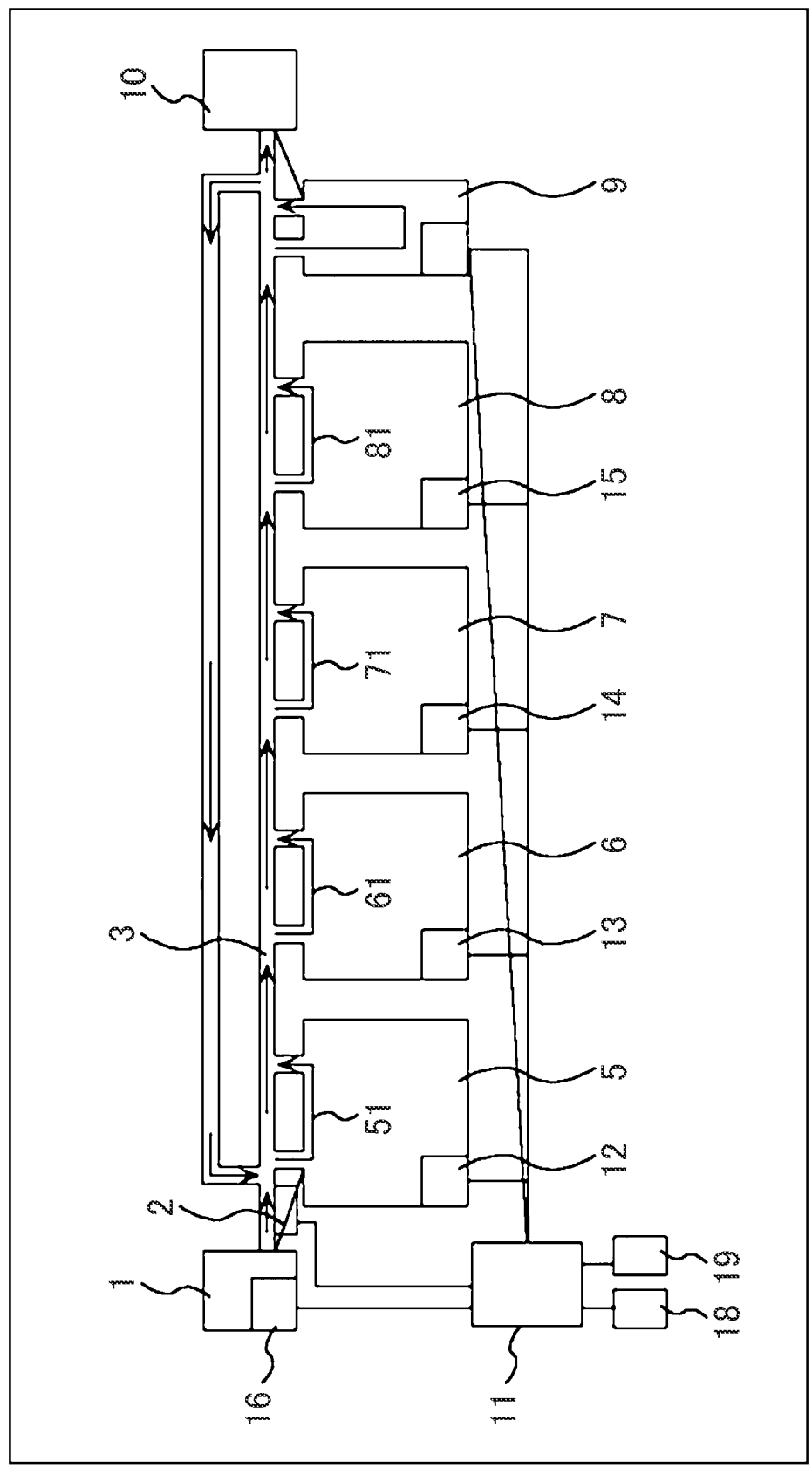
FIG. 1 is a system block diagram showing an overall schematic configuration of an automatic analyzer according to a first embodiment.

FIG. 1 is a system block diagram showing an overall schematic configuration of an automatic analyzer according to Example 1 of the present invention.

In FIG. 1, an analysis system according to Example 1 includes a sample rack loading unit (rack loading unit) 1, an ID reading unit 2, a transportation line (transportation mechanism) 3, analysis units 5, 6, 7, and 8, a sample rack standby unit 9, a sample rack recovery unit 10, and an overall management computer (overall management control unit) 11. A sample rack for holding a sample, a wash rack for holding a cleaning liquid, a calibration rack for holding a standard solution, or a quality control rack for holding quality control material is loaded into the sample rack loading unit 1.

Further, the analysis units 5, 6, 7, and 8 include control computers 12, 13, 14, and 15 that perform control for necessary processing in each analysis unit. The sample rack loading unit 1 is a portion for loading multiple racks for holding one or multiple samples (samples). Each transportation of the sample rack from the transportation line 3 to the analysis units 5, 6, 7, and 8 is performed by pulling the sample rack into retraction lines (retraction mechanisms) 51, 61, 71, and 81, respectively. The sample rack loading unit 1 includes a control computer 16. An operation unit 18 and a display unit 19 are connected to the overall management computer 11.

The analysis units 5, 6, 7, and 8 are disposed along the transportation line 3 and are detachably connected to the transportation line 3. The number of analysis units (analysis units) may be arbitrary, and in Example 1, four analysis units are provided. In Example 1, a case in which each of the analysis units 5, 6, 7, and 8 are a biochemical analysis unit (biochemical analysis unit) or an electrolyte analysis unit (electrolyte analysis unit) will be described as an example.

The configurations of the analysis units 5, 6, 7, and 8 may be a configuration including an immunoassay unit (immunoassay unit), a configuration of all biochemical analysis units, or a configuration of all electrolyte analysis units.

Figure 2:
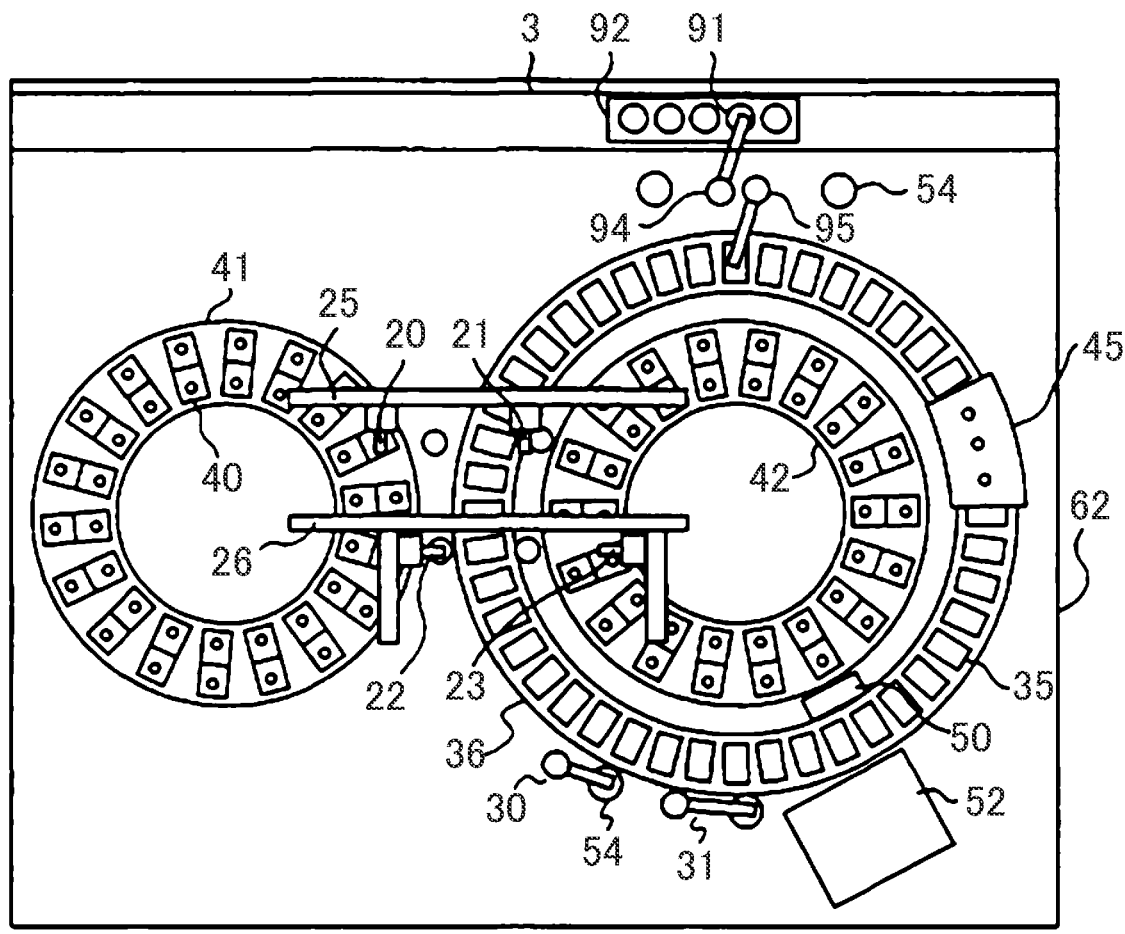
FIG. 2 is a schematic top view of a biochemical unit.

FIG. 2 is a schematic top view of one of the analysis units 5, 6, 7, and 8.

In FIG. 2, reaction containers 35 are arranged on the circumference of a reaction disk 36 on a case 62. A reagent disk 42 is disposed inside the reaction disk 36, and a reagent disk 41 is disposed outside the reaction disk 36. Multiple reagent containers 40 can be placed on the circumferences of the reagent disks 41 and 42. Two reagents are contained in one reagent container 40.

The transportation line 3 for moving a sample rack 92 on which the sample container 91 is placed is installed in the vicinity of the reaction disk 36. Rails 25 and 26 are disposed on the reagent disk 41 and the reagent disk 42, and reagent dispensing probes 20 and 21 that can move in the direction parallel to the rail 25 and in the vertical direction are installed on the rail 25, and reagent dispensing probes 22 and 23 that can move in the three axial directions of the rail are installed on the rail 26.

The sample container 91 may be a container for accommodating the standard solution, and the sample rack 92 may be a calibration rack on which the container for accommodating the standard solution is placed.

Further, the sample container 91 can be a container for accommodating a quality control sample, and the sample rack 92 can be a quality control rack on which the container for accommodating the quality control sample is placed.

The reagent dispensing probes 20, 21, 22, and 23 are each connected to a reagent pump not shown in the figure. Sample dispensing probes 94 and 95 that can rotate and move up and down are installed between the reaction containers 35 and the transportation line 33. Each of the sample dispensing probes 94 and 95 is connected to a sample pump, which is not shown in the figure.

Stirring device 30, 31, a light source 50, a detection optical device 52, and a container cleaning mechanism 45 are disposed around the reaction disk 36. The container cleaning mechanism 45 is connected to a cleaning pump (not shown in the figure).

Cleaning ports 54 are provided in the respective operating ranges of the sample dispensing probes 94 and 95, the reagent dispensing probes 20, 21, 22, 23, and the stirring devices 30 and 31. A replenishment reagent storage (not shown) is installed on the reagent disk 41. The multiple reagent containers 40 can be mounted in the replenishment reagent storage. The sample pumps, the reagent pumps, the cleaning pumps, the detection optical devices 51, the reaction containers 35, the reagent disk 41, the reagent dispensing probes 20, 21, 22, and 23, and the sample dispensing probes 94, 95 which are not shown in the figure, are connected to the controller 60 (referred to as the controller 60 on behalf of the control computers 12, 13, 14 and 15).

One of the sample dispensing probes 94 and 95 descends with respect to the sample (sample), and one of the sample dispensing probes 94 and 95 dispenses the sample along with the descending operation. The dispensed sample is discharged into the reaction container 35 of the reaction disk 36 at a sample (sample) dispensing position. The reaction container 35 from which the sample has been discharged is moved to a first reagent dispensing position by the rotation of the reaction disk 36, where the reagent container 40 held in the reagent disk 41 or 42 is dispensed in the reaction container 35 by the first reagent dispensing probe 22 or 23. The reaction container 35 into which the first reagent has been dispensed is moved to a stirring position, where the sample and the first reagent are stirred by the stirring device 31 or 32.

Further, when the addition of the second reagent is required, the stirred reaction container 35 is moved to the second reagent dispensing position, where the second reagent held on the reagent disk 41 or 42 is dispensed into the reaction container 35 by the second reagent dispensing probe 22 or 23. The dispensed reaction container 35 is moved to a stirring position, where the sample, the first reagent, and the second reagent in the reaction container 35 are stirred by the stirring device 30 or 31, and the reaction solution is generated.

The reaction container 35 containing the reaction solution is moved to a measurement position, where the detection optical device 51 measures a multi-wavelength absorbance of the reaction solution, and the analysis result of the analysis item is obtained. In the present analysis sequence, not only a patient sample but also a calibration analysis and a quality control measurement are analyzed in the same procedure.

When performing the cleaning operation, generally, one of the sample dispensing probes 94 and 95 is sucked from the sample container 91 filled with the cleaning liquid and discharged to the reaction container 35 to form the sample dispensing probe 94 or 95 and the necessary parts. Perform a cleaning operation on.

Figure 3:
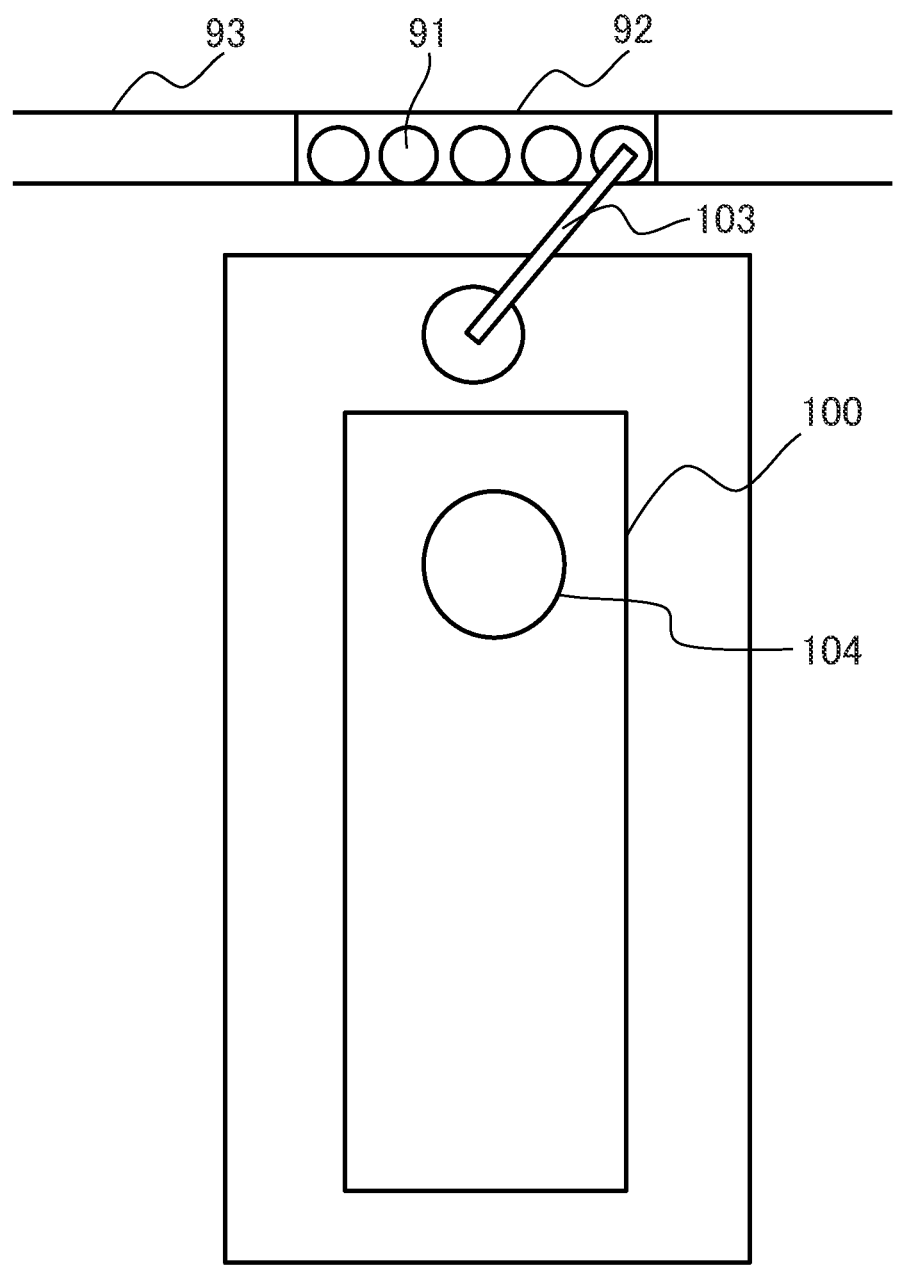
FIG. 3 is a schematic top view of an electrolyte analysis unit.

FIG. 3 is a schematic top view of the electrolyte analysis unit.

In the electrolyte analysis unit, the sample rack 92 containing the sample container 91 is transported to a sample suction position by the transportation line 33. The sample is suctioned from the sample container 91 on the sample rack 92 by the sample dispensing probe 103, and the sample is discharged to a dilution tank 104 of the analysis unit 100 in the electrolyte analysis unit.

Figure 4:
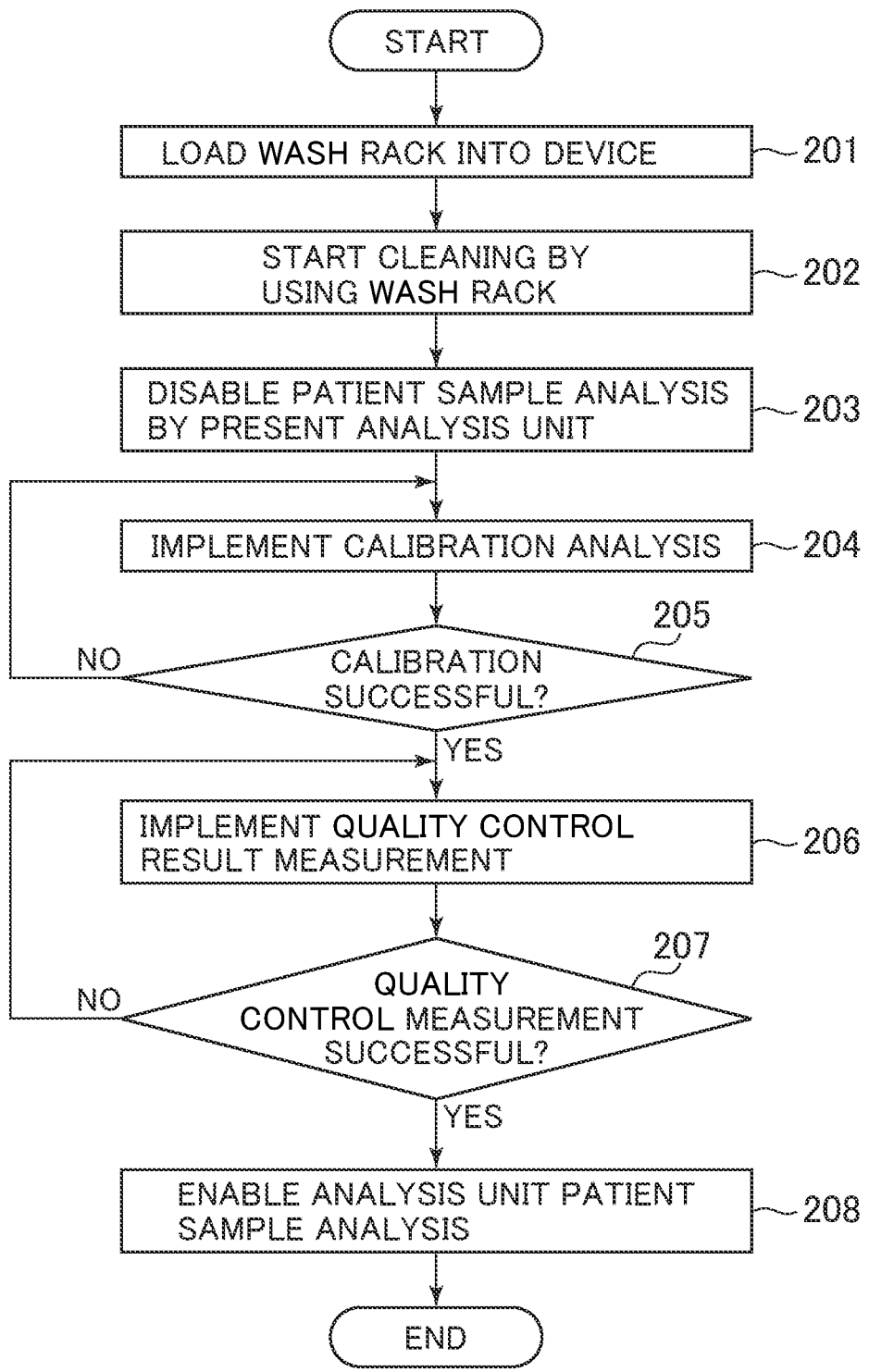
FIG. 4 is a diagram showing a processing flow of device performance confirmation in conjunction with execution of a wash rack.

FIG. 4 is a diagram showing a processing flow of device performance confirmation accompanying the execution of the wash rack.

Hereinafter, a cleaning target in the wash rack will be described as an electrolyte analysis unit, but the cleaning using the wash rack is not limited to the electrolyte analysis unit, and a biochemical analysis unit, an immunoassay unit, or the like may be a cleaning target.

The user prepares for the cleaning operation by installing a conditioner on the wash rack for the purpose of removing the influence of a detergent wash used for cleaning and the detergent after cleaning.

In Step 201 of FIG. 4, the wash rack is installed in the sample rack loading unit 1, and the rack is transported to any of the analysis units 5 to 8 of the automatic analyzer. The wash rack is an example of a case where the wash rack is transported to the electrolyte analysis unit to be cleaned. The operation in the electrolyte analysis unit is controlled by the computer in the electrolyte analysis unit.

In Step 202, the cleaning operation is started in the electrolyte analysis unit.

In the electrolyte analysis unit described in Example 1, the dilution tank is cleaned by filling the dilution tank with a cleaning liquid by discharging the cleaning liquid multiple times to the dilution tank in the electrolyte analysis unit. Next, a flow path cleaning of the electrolyte analysis unit is carried out by using the above cleaning liquid. Finally, a conditioner installed on the wash rack is used to condition the flow paths of the sample dispensing mechanism, the dilution tank, and the electrolyte analysis unit.

The process proceeds to Step 203, and at the time when the cleaning operation starts (that is, a time when the suctioning operation of the cleaning liquid on the wash rack starts) as a trigger, the analysis of the patient sample using the present analysis unit (in the example of FIG. 4, the electrolyte analysis unit) is disabled (the sample analysis operation is stopped). Specifically, the transportation of the sample to the present analysis unit is stopped. In that case, if there is no an analysis request for the sample in another analysis unit, analysis by the present analysis unit is disabled, so that even if there is an analysis request in the present analysis unit, the sample loaded into the sample rack loading unit 1 is not analyzed by the present analysis unit but is recovered by the sample rack recovery unit 10.

At this point, the cleaning operation has been completed, but the condition of the electrolyte analysis unit is not guaranteed.

Therefore, in Step 204, the overall management computer 11 recommends calibration analysis to the control computer of the electrolyte analysis unit, and displays on the display unit 19 that a rack (hereinafter referred to as a calibration rack) in which a container containing a standard solution is installed into the sample rack roading unit 1. In response to this display, the user sets a calibration request and installs the calibration rack in the sample rack loading unit 1. As a result, the calibration rack is transported into the electrolyte analysis unit, and the calibration measurement is performed on the analysis unit (electrolyte analysis unit in this example) that has been cleaned by the wash rack.

In Step 205, it is determined whether or not the calibration has been successful.

If the calibration fails, the effect of the above cleaning may occur, Therefore, the cleaning is performed again or another maintenance is performed to improve the device condition and the calibration analysis is performed again. As a result, the device condition will be restored.

If it is determined in Step 205 that the calibration has been successful, in Step 206, in order to confirm that the present analysis unit maintains the performance satisfying the device specifications, the overall management computer 11 recommends the control sample analysis for the control computer, and displays this recommendation on the display unit 19. In response to this display, the user sets a request for quality control sample analysis, and installs a rack in which the quality control sample is installed in the sample rack loading unit 1. A rack (hereinafter referred to as "quality control rack") in which in which the container containing the quality control sample is installed in a rack loading port is installed in the sample rack roading unit 1, and transported into the automatic analyzer so that the quality control sample is measured by the analysis unit (electrolyte analysis unit in this example).

In Step 207, the control computer in the electrolyte analysis unit determines whether or not the quality control measurement has been successful. If a quality control measurement result value is not within a quality control range, it can be determined that the performance check of the present analysis unit has not been completed (cleaning operation has not been completed normally), so that the sample analysis operation of the electrolyte analysis unit is stopped.

If the quality control measurement result value is within the quality control range, it can be determined that the performance confirmation of the present analysis unit has been completed. Therefore, the patient sample can be analyzed with the analysis unit that has performed the cleaning operation with the wash rack in Step 208. That is, the sample is transported to the analysis unit that has been cleaned, and the sample can be dispensed into the analysis unit 100 by the sample dispensing probe 1.

If the quality control sample measurement result is out of the specification range in Step S207, the quality control sample measurement is performed again, or the quality control sample measurement is performed again after the calibration is reanalyzed, so that the device condition is confirmed again. (In the processing flow of FIG. 4, the method of performing the measurement of the quality control sample again is described.)

With the above process, after the cleaning operation has been performed by the wash rack, the present analysis unit cannot analyze the patient sample until the performance is confirmed, so that the device performance can be guaranteed and the correct patient sample result can be output. That is, the sample analysis operation of the present analysis unit is stopped until it is determined that the performance of the analysis unit is normal based on the cleaning operation.

It is conceivable that the cleaning operation by the wash rack may not be completed normally due to insufficient cleaning due to insufficient cleaning liquid installed in the wash rack or interruption of the cleaning operation due to an abnormality during the operation of the mechanism.

Therefore, in the above case, the cleaning operation is determined as "failure", and the present analysis unit cannot be used until the cleaning operation by the wash rack is normally completed again.

Figure 5:
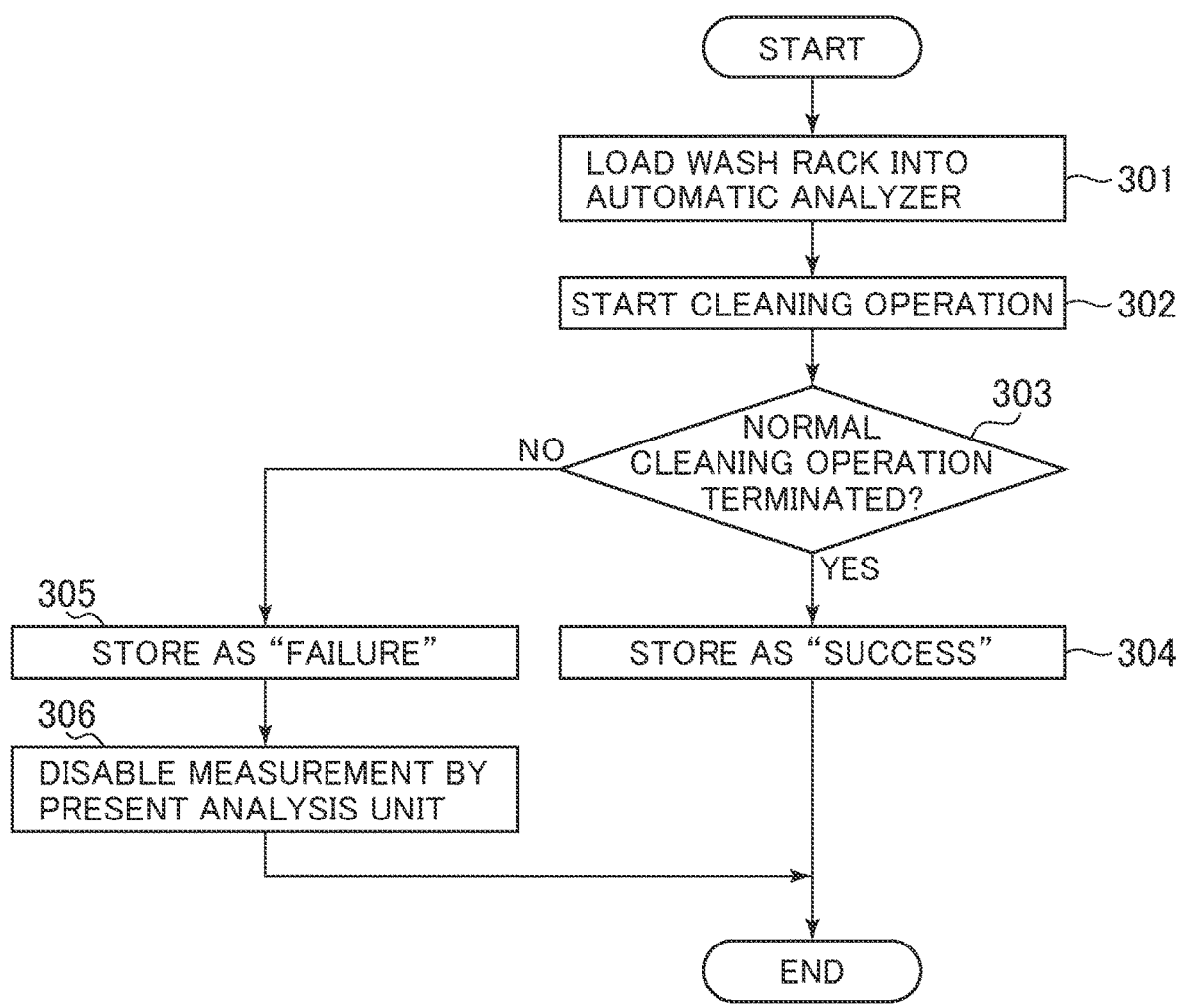
FIG. 5 shows a procedure flow when cleaning operation by the wash rack is not normally completed.

FIG. 5 is a diagram showing a procedure flow when the cleaning operation by the wash rack is not normally completed.

Hereinafter, a case where the cleaning operation by the wash rack is not normally completed according to the processing flow shown in FIG. 5 will be described. In the present processing flow, the electrolyte analysis unit will be described as an example of the unit to be cleaned.

In Step 301, the wash rack is installed in the sample rack loading unit 1, and the rack is transported to any of the analysis units 5 to 8. This wash rack is transported to the electrolyte analysis unit to be cleaned.

Next, in Step 302, the cleaning liquid installed in the wash rack is suctioned by the sample dispensing mechanism to start the cleaning operation.

After the cleaning operation has been completed, it is determined in Step 303 whether or not the cleaning operation has been correctly executed. When all the planned cleaning operations have been normally completed (completed), the present cleaning operation is stored as "success" in the storage units of the control computer and the overall management computer 11 in the analysis unit in Step 304.

On the other hand, when it is determined that suction cannot be performed correctly due to a liquid level detection function and a pressure fluctuation during suction at the time of suctioning the cleaning liquid and conditioner in the sample dispensing mechanism, or when it is determined that a predetermined cleaning operation cannot be correctly executed such as stopping the cleaning operation due to mechanical operation abnormality during the cleaning operation, the present cleaning operation is stored as "failure" in Step 305. If the cleaning operation is stored as "failure", it is determined that this state affects the analysis, and in Step 306, subsequent calibration analysis, quality control measurement, and measurement by the present analysis unit including the patient sample and so on are disabled. In other words, the control computer in the present analysis unit disables the measurement in the present analysis unit, stops the measurement operation, and the overall management computer 11 is also notified that the measurement in the present analysis unit is disabled, and the display unit 19 displays that the measurement in the present analysis unit is disabled.

In order to recover from the state where measurement by the present analysis unit is disabled, there is a need to perform the cleaning operation using the wash rack again and perform "success".

That is, the user again puts the wash rack into the sample rack loading unit 1, the overall management computer 11 transports the wash rack to the present analysis unit by the transportation line 3, and the present analysis unit executes the operations shown in FIGS. 4 and 5. Then, the cleaning operation using the wash rack is performed. The above process is repeated until the cleaning operation is determined to be "successful".

As a result, if the device condition changes after cleaning with the wash rack, the routine analysis is stopped, the user can recognize that the routine analysis is stopped, and the cleaning operation is performed again, thereby making it possible to avoid performing an analysis that affects the measurement results.

According to Example 1 of the present invention, the automatic analyzer capable of maintaining the normal device condition and exhibiting stable performance can be realized by automatically monitoring the cleaning execution status using the wash rack.

Example 2

Next, Example 2 of the present invention will be described.

Example 2 is an example in which the same cleaning operation by the wash rack as in Example 1 is periodically performed, and a periodic maintenance is surely executed.

In general, a cleaning maintenance including cleaning operation by awash rack is required to specify an execution interval and perform maintenance according to the above specified interval. That is, the performance of the automatic analyzer is ensured by performing maintenance at the above interval. Therefore, if the maintenance is not performed within the above interval, the condition of the automatic analyzer may deteriorate and the measurement result may be affected.

Therefore, when a time when the cleaning operation is performed by a previous wash rack is stored, a period from the previous cleaning operation by the wash rack is monitored, and the cleaning operation using the wash rack is not executed within the specified period in the target analysis unit, the target analysis unit is disabled for analysis.

Figure 6:
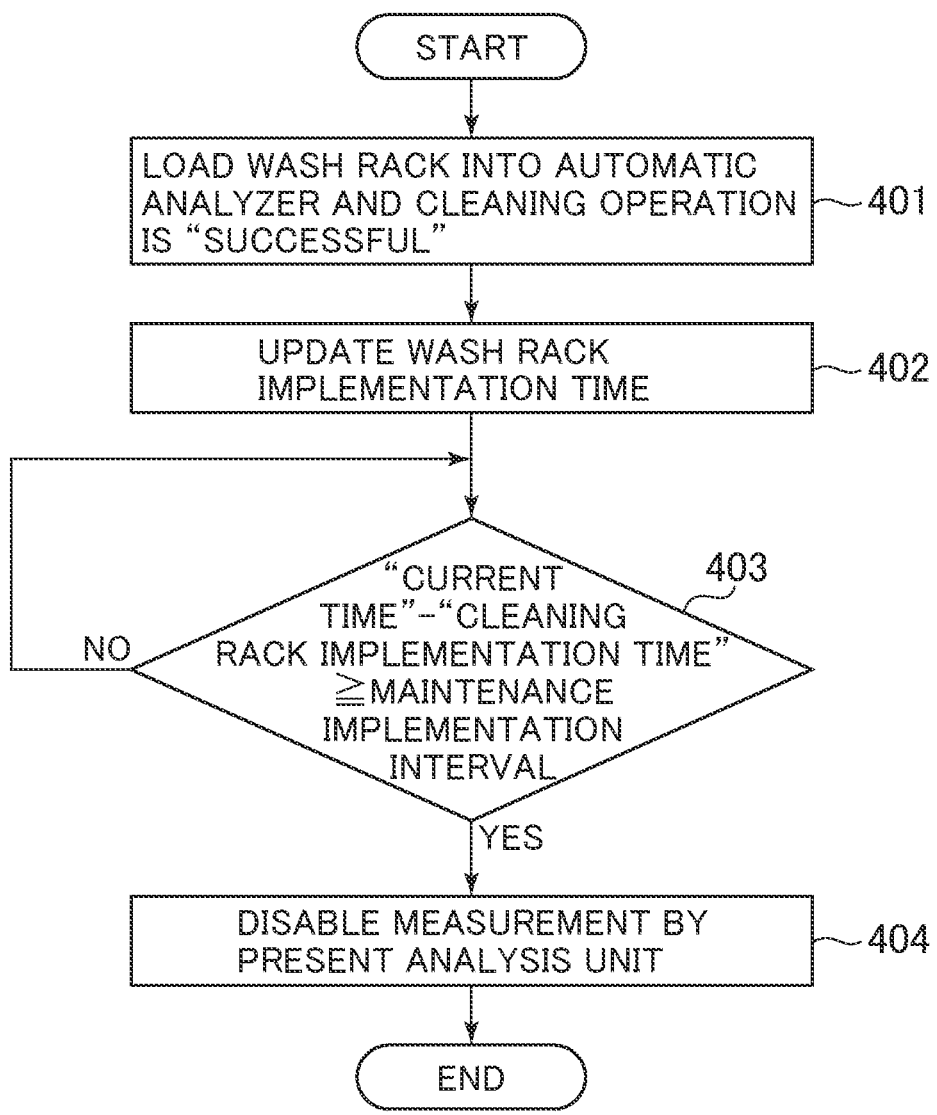
FIG. 6 is a diagram showing a monitoring procedure of a cleaning execution situation by a wash rack according to a second embodiment.

FIG. 6 is a diagram showing a procedure for monitoring the cleaning implementation status by the wash rack.

In Step 401 of FIG. 6, the cleaning operation using the wash rack is performed on the target analysis unit in the same manner as in Example 1 to make the cleaning operation "successful".

Then, the process proceeds to Step 402, and the date and time when the maintenance of the wash rack is successful is stored in the overall management computer 11 and the control computer of the target analysis unit.

After that, in Step 403, a current time is compared with a success time of the cleaning operation by the wash rack, and an elapsed time from the previous success time of the cleaning operation of the wash rack is calculated. If this elapsed time is compared with the specified maintenance implementation interval and it is determined that the maintenance implementation interval is longer, the present analysis unit can continue to be used for analysis. According to the above determination, even if the analysis can be used continuously, when a certain period of time has passed after the previous cleaning implementation by the cleaning rack, a fact that the user will soon be required to perform the cleaning operation using the cleaning rack is displayed on a screen of the display unit 19 or notified by alarm, so that the user may be urged to prepare for the next cleaning by the wash rack.

If the elapsed time is longer, the present overall management computer 11 and the control computer of the present analysis unit determine that the present analysis unit needs to be cleaned by the wash rack, and the measurement using the present analysis unit is disabled in Step 404. At this time, a fact that the user may be notified by the screen display of the display unit 19 or an alarm that the cleaning operation by the wash rack is required.

The above-mentioned specified period may have a fixed value in each of the analysis units 5 to 8, or may be configured so that the maintenance implementation period can be changed from the screen of the display unit 19.

In this way, after the certain period of time has lapsed, the sample analysis operation of the present analysis unit is stopped until the analysis unit performs the cleaning operation.

Figure 7:
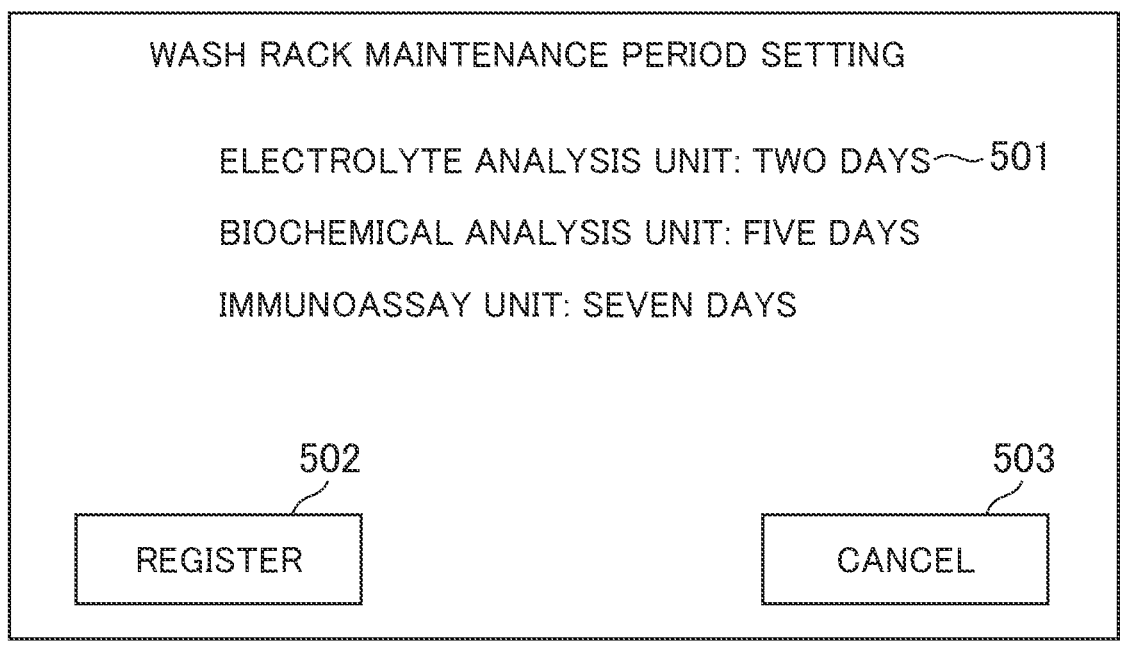
FIG. 7 is a diagram showing an example of a screen of a display unit capable of changing a maintenance execution period.

FIG. 7 is a diagram showing a screen example of the display unit 19 in which the maintenance implementation period can be changed. Hereinafter, a configuration for changing the wash rack maintenance implementation period will be described with reference to FIG. 7.

The maintenance implementation period is entered in an implementation period setting unit 501 of FIG. 7. In the example shown in FIG. 7, the maintenance implementation period can be set in units of days, but may be entered in units of another such as "hour". Further, in the example shown in FIG. 7, the maintenance implementation period can be set for each analysis unit type (electrolyte analysis unit, biochemical analysis unit, and immunoassay unit), but only one maintenance implementation period common to each analysis unit may be defined. After the present maintenance implementation time has been entered, the setting can be completed by pressing a registration button 502, and the changed value can be discarded by pressing a cancel button 503.

In the above description, as the wash rack maintenance implementation management, a procedure of management by time using the previous wash rack implementation date and time and the maintenance implementation period is shown, but a case of the number of measurements may be considered as a factor of the deterioration of the device condition.

Figure 8:
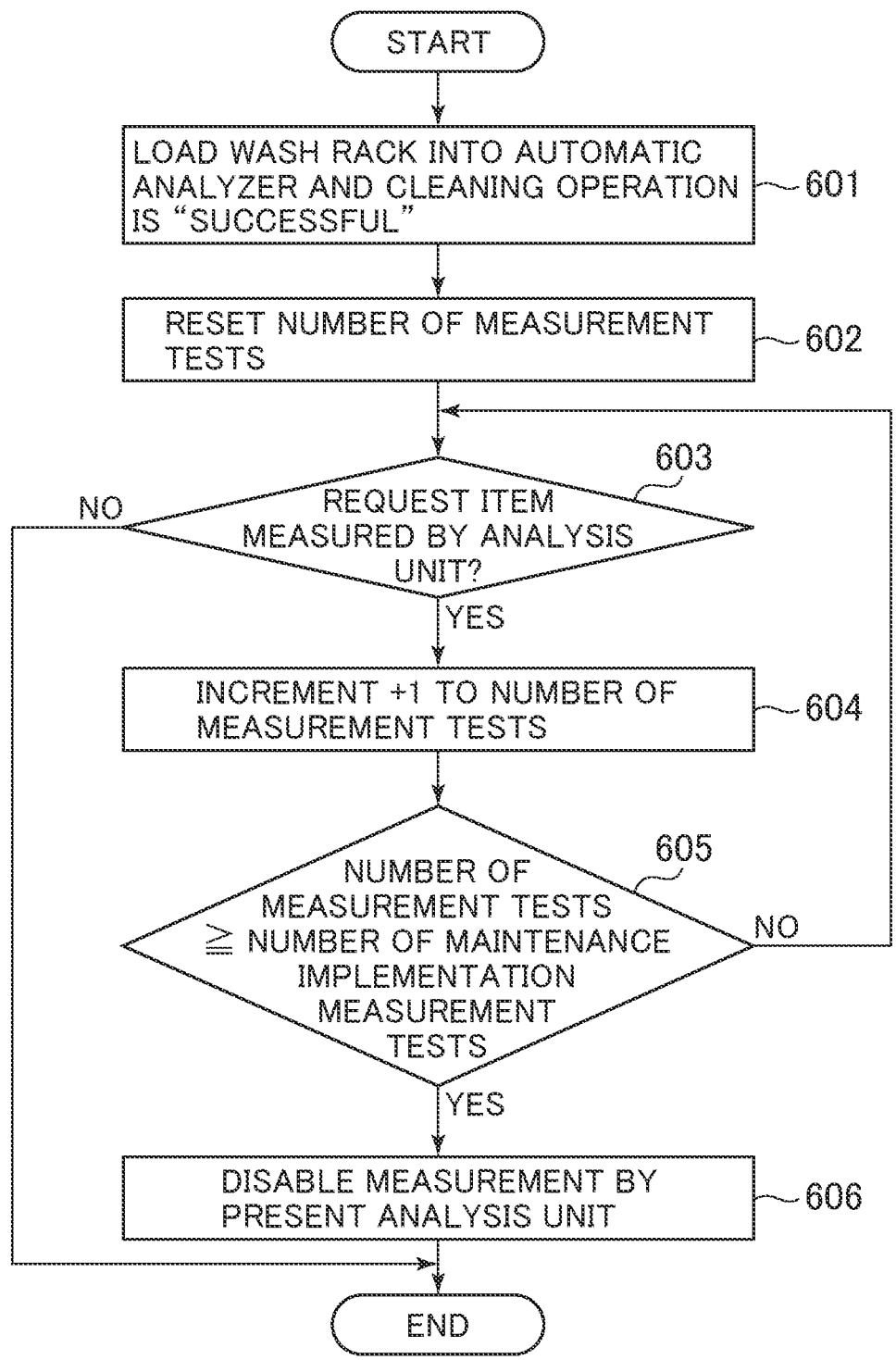
FIG. 8 is a diagram showing a processing flow for cleaning management by a wash rack with the use of the number of measurement tests (number of analyses).

Therefore, FIG. 8 is a diagram showing a processing flow for cleaning management by the wash rack using the number of measurement tests (number of analyses) The procedure for managing cleaning will be described with reference to the processing flow shown in FIG. 8.

In Step 601 of FIG. 8, the cleaning operation using the wash rack is performed on the corresponding analysis unit in the same manner as in Example 1 and made "successful". Then, in Step 602, the number of measurement tests (number of analyses) of the analysis unit that performs the cleaning operation by the wash rack is reset to 0.

Next, in Step 603, when the measurement (analysis) is performed by the analysis unit that has been washed in the wash rack, 1 is added to the number of measurement tests in Step 604.

Next, in Step 605, the number of measurement tests is compared with the number of maintenance implementation measurement tests specified in the corresponding analysis unit. If the number of maintenance implementation measurement tests is large, the present analysis unit can be continuously used for analysis.

In the above determination, even if the present analysis unit can be continuously used for analysis, a fact that the user will soon be required to perform the cleaning operation using the cleaning rack is displayed on the screen of the display unit 19 or notified by alarm, so that the user may be urged to prepare for the next cleaning by the wash rack.

When the measurement test count value and the number of maintenance implementation measurement tests are equal to or greater than the same number, the present analysis unit determines that cleaning with the wash rack is required, and in Step 606, measurement using the present analysis unit is disabled. (Stop the sample analysis operation). At this time, the overall management control computer (overall management control unit) 11 can also notify the user that the cleaning operation by the wash rack is required by the screen display of the display unit 19 or the alarm notification. In this case, a fact that the cleaning operation is required can be displayed before a certain period of time when the cleaning operation by the wash rack is required.

Figure 9:
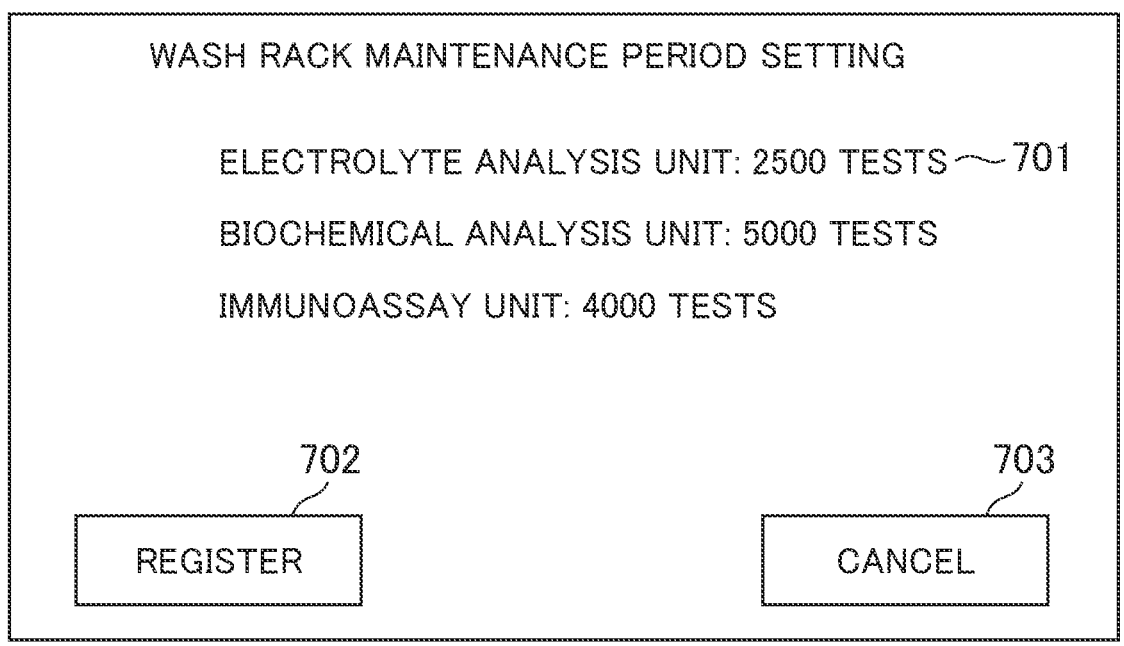
FIG. 9 is a diagram showing an example of a display screen for changing the number of maintenance execution analysis tests.

The number of maintenance implementation measurement tests may have a fixed value in the automatic analyzer, or the number of maintenance implementation analysis tests may be changed from the display screen of the display unit 19 as shown in FIG. 9.

The method of changing the number of wash rack maintenance implementation measurement tests will be described below with reference to FIG. 9.

The number of maintenance implementation measurement tests is entered by an implementation measurement test number setting unit 701 in FIG. 9. In the example shown in FIG. 9, the number of maintenance implementation measurement tests can be set in the analysis unit type unit (electrolyte analysis unit, biochemical analysis unit and immunoassay unit), but only one maintenance implementation measurement test number may be defined in the automatic analyzer.

After the number of maintenance implementation measurement tests has been entered, the setting is completed by pressing the registration button 702, and the changed value can be discarded by pressing the cancel button 703.

According to Example 2 of the present invention, the same effects as those of Example 1 can be obtained, and when the cleaning operation using the wash rack is not executed in the target analysis unit within the specified period, the target analysis unit is disabled for analysis. Therefore, the analysis can be avoided from being executed even though the cleaning operation using the wash rack is not performed for a long time, and the device condition has changed.

Example 3

Next, an example in which a cleaning operation is executed without preventing analysis of a patient sample when the patient sample is transported into an automatic analyzer during measurement in the automatic analyzer will be described according to Example 3 of the present invention.

There are many cases in which when a rack with a sample to be measured is placed in the automatic analyzer having multiple analysis units, the order of transporting the racks to the analysis units differs depending on the analysis request items of the sample and the analysis status of each analysis unit.

In the above environment, in the example described above, when the wash rack is put into the automatic analyzer and the cleaning operation is started by the analysis unit to which the wash rack is transported, the present analysis unit cannot be used until the present analysis unit performs calibration and quality control sample measurement, and the confirmation of the device condition can be completed.

As a result, even in the case of the sample loaded before the wash rack is loaded into the automatic analyzer, request items for which the measurement by the analysis unit that has been cleaned is not completed cannot be measured, and the cleaning operation is normally completed, and thereafter the results of all the request items may not be complete until the measurement is completed for the request items for which the measurement has not been completed, and the throughput may decrease.

Therefore, when the wash rack is carried into the automatic analyzer, the overall management computer 11 confirms the unanalyzed items among the request items for the sample being measured in the automatic analyzer, and when there are unmeasured items to be analyzed in the analysis unit planned to be cleaned using the cleaning rack, the wash rack transportation to the above analysis unit is temporarily waited in the automatic analyzer.

Then, when all the measurement of the analysis scheduled items is completed in the analysis units planned to be cleaned in the above wash rack have been completed, the wash rack temporarily standing by in the automatic analyzer is transported to the target unit to perform the cleaning operation.

Figure 10:
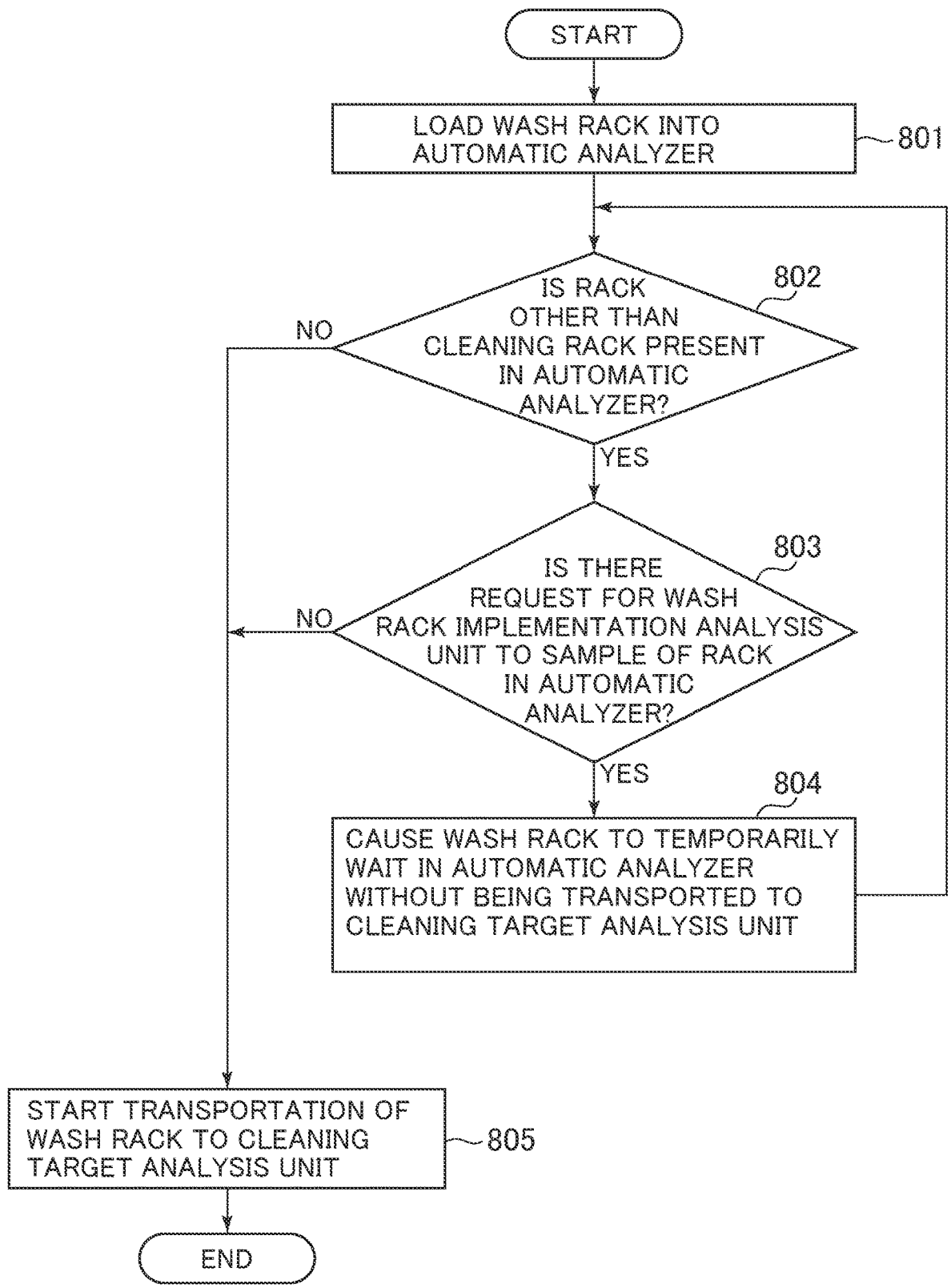
FIG. 10 is a diagram showing a flowchart showing means for optimizing the transportation of a wash rack according to an analysis execution situation in an automatic analyzer according to a third embodiment.

FIG. 10 is a diagram showing a flowchart showing means for optimizing the transportation of the wash rack according to the analysis execution status in the automatic analyzer.

In Step 801 of FIG. 10, the user installs the wash rack on which the cleaning liquid and the conditioner are installed in the sample rack loading unit 1 of the automatic analyzer. Next, in Step 802, the overall management computer 11 of the automatic analyzer determines whether or not a rack other than the wash rack exists in the automatic analyzer. That is, when the overall management computer 11 recognizes the existence of the wash rack in the automatic analyzer, the overall management computer 11 confirms whether or not there exists a rack in which the standard solution used for calibration, the quality control sample used for quality control measurement, the patient sample, and so on are installed in the automatic analyzer.

If the rack does not exist in the automatic analyzer in Step 802, the process proceeds to Step 805, and the overall management computer 11 transports the wash rack to the analysis unit to be cleaned, and the analysis unit to be cleaned starts the cleaning operation.

If there is a rack other than the wash rack in the automatic analyzer in Step 802, the overall management computer 11 confirms the request items of the samples on all the racks in the automatic analyzer in Step 803. If there are no unmeasured request items in the analysis unit to be cleaned in the wash rack among the above request items, even if the rack remains in the automatic analyzer, the wash rack is transported to the cleaning target analysis unit in Step 805, and the cleaning operation is performed.

In Step 803, if there is a request item that has not been measured by the analysis unit to be cleaned in the wash rack among the above request items, the process proceeds to Step 804, and the wash rack is temporarily stood by in the sample rack standby unit 9 in the automatic analyzer.

After that, in Steps 802 and 803, it is confirmed whether or not there are racks other than the wash rack in the automatic analyzer and whether or not unmeasured request items in the cleaning target analysis unit, respectively. If there are no items to be analyzed in Step 805, the wash rack is started to be transported to the analysis unit to be cleaned.

Cleaning using the wash rack of the analysis unit to be cleaned is performed in the same operation as in Example 1.

According to the operation of Example 3, the user can put in the wash rack without being aware of the analysis status of the sample when the automatic analyzer is continuing the routine analysis.

In Example 3 of the present invention, as in Example 1, the cleaning execution status using the wash rack is automatically monitored, so that the automatic analyzer capable of maintaining the normal device condition and exhibiting stable performance can be realized.

Example 4

Next, Example 4 of the present invention will be described.

Example 4 is an example in which the device condition can be correctly confirmed after the wash rack is loaded.

In the present invention, after the cleaning operation by the wash rack has been performed, the measurement by the present analysis unit becomes feasible when the calibration analysis and the quality control sample measurement are successful.

Therefore, when the wash rack is put into the automatic analyzer and the cleaning operation is performed, the user puts the calibration rack and the quality control rack into the automatic analyzer and performs the calibration analysis and the quality control sample measurement.

Due to the above process, in the calibration rack and quality control rack that are loaded after the wash rack that is loaded into the automatic analyzer, the calibration analysis and the quality control sample measurement are expected to be performed after cleaning by the wash rack has been completed.

However, an example in which the analysis may not be performed in the above order will be described below.

The wash rack is planned to perform the cleaning operations in the first analysis unit and the second analysis unit, but after that, only the test items of the second analysis unit are requested and the above rack is loaded for the standard solution on the calibration rack and the quality control sample on the quality control rack, which are put into the automatic analyzer.

The wash rack first performs the cleaning operation in the first analysis unit, while the calibration rack and the quality control rack are first transported to the second analysis unit to perform the calibration measurement and the quality control sample measurement.

As a result, the second analysis unit may perform the calibration analysis and the quality control sample measurement before the cleaning operation by the wash rack is performed. In that case, after the calibration analysis and the quality control sample measurement are performed, cleaning with the wash rack is performed, and the calibration analysis and the quality control analysis are required again, which may result in behavior different from the user's intention.

Therefore, when the calibration rack and the quality control sample rack are transported to the automatic analyzer following the wash rack, when the wash rack is planned to be transported to the analysis unit to which the calibration rack and the quality control rack are transported next, the calibration rack and the quality control rack are temporarily stood by in the automatic analyzer, and the calibration rack and the quality control rack are not transported to the analysis unit. Then, after the wash rack has been transported to the analysis unit, and all the cleaning operations have been completed, the calibration rack and the quality control rack are transported to the analysis unit.

Figure 11:
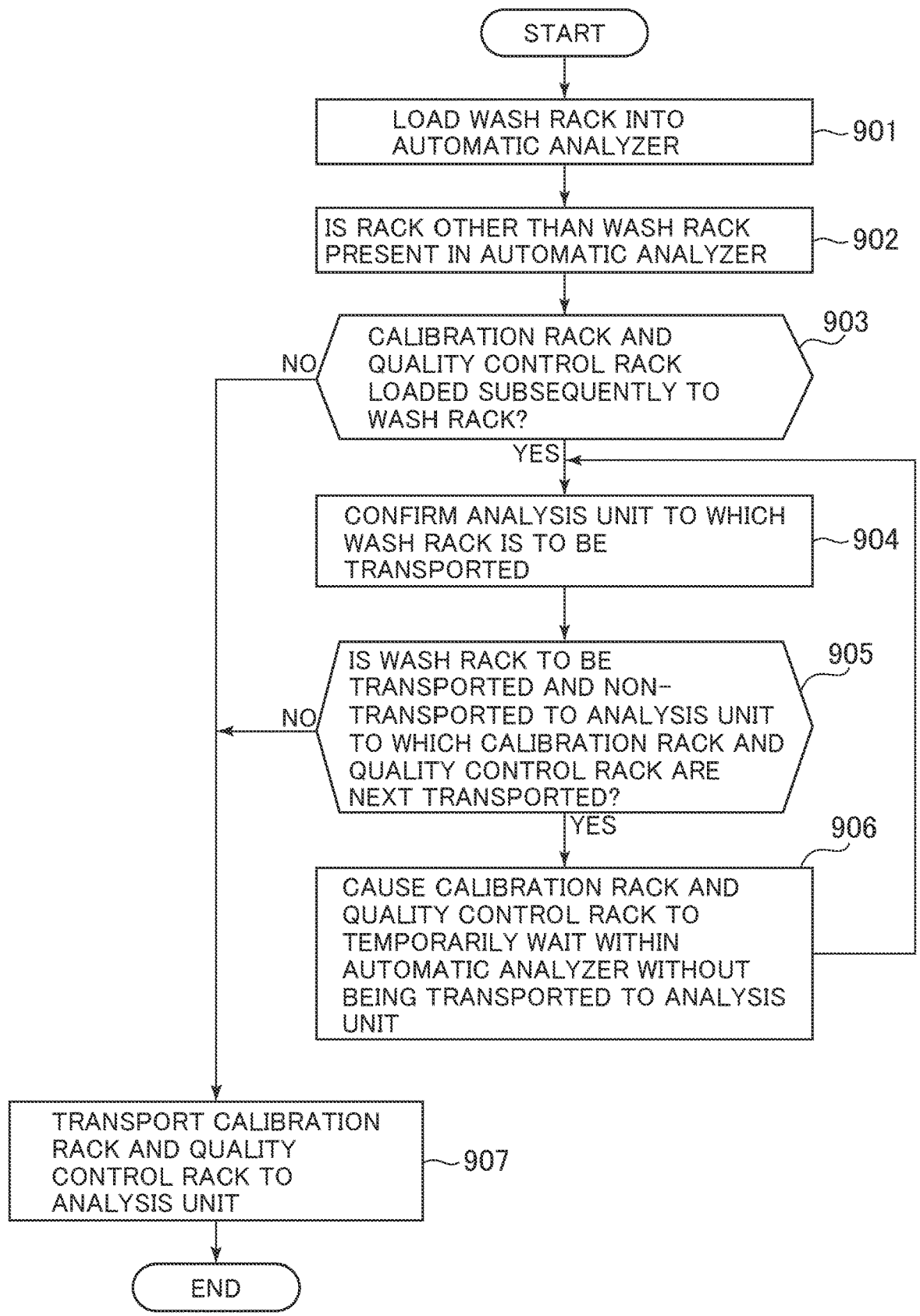
FIG. 11 is a diagram showing a transportation processing flow of a wash rack, a calibration rack, and a quality control rack according to a fourth embodiment.

FIG. 11 is a diagram showing a transportation processing flow of the wash rack, the calibration rack, and the quality control rack in Example 4.

In Step 901 of FIG. 11, the wash rack is installed in the sample rack loading unit 1 and transported into the automatic analyzer. At that time, the wash rack is started to be transported to the analysis unit to be cleaned.

Next, when the calibration rack and the quality control rack are transported to the automatic analyzer by the user in Step 902, the overall management computer 11 confirms (determines) whether or not the calibration rack and the quality control rack have been delivered next to the wash rack in Step 903.

When it is confirmed in Step 903 that the calibration rack and the quality control rack are carried into the automatic analyzer next to the wash rack, the overall management computer 11 recognizes that the calibration rack and the quality control rack are used for the analysis associated with the wash rack. Then, in Step 904, it is confirmed the transportation plan analysis unit of the wash rack carried before the calibration rack and the quality control rack.

Next, in Step 905, it is determined whether or not the wash rack is planned to be transported to the analysis unit to be transported next by the calibration rack and the quality control rack, but has not been transported. If the wash rack is planned to be transported but has not been transported, the wash rack temporarily waits in the sample rack standby unit 9 in the automatic analyzer temporarily in Step 906.

In Step 905, if the wash rack has already been transported or is not planned to be transported to the analysis unit to be transported by the calibration rack and the quality control rack, the process proceeds to Step 907, and the calibration rack and the quality control rack are transported to the target analysis unit. After that, when the calibration rack and the quality control rack waiting to be transported are in the automatic analyzer, the overall management computer 11 monitors the transportation status and the cleaning execution status of the wash rack, the wash rack is transported, and when the calibration rack and the quality control rack are waiting for transportation to the analysis unit where cleaning operation has been completed, the calibration rack and the quality control rack are started to be transported to the present analysis unit.

According to Example 4 of the present invention, the same effects as those of Example 1 can be obtained, and after the calibration operation and the quality control sample analysis can be reliably executed after the cleaning operation associated with the wash rack has been normally completed by the rack transportation process described above so that the analysis can be performed in the order intended by the user.

Example 5

Next, Example 5 of the present invention will be described.

Example 5 is an example in which the device condition after the wash rack has been loaded can be easily confirmed.

In Examples 1 to 4 of the present invention, the present analysis unit can be used for the measurement when the calibration analysis and the quality control sample measurement are successful after the cleaning operation by the wash rack has been performed. Therefore, when the wash rack is put into the automatic analyzer and the cleaning operation is performed, the user requests the calibration and the quality control sample measurement of all the analysis items of the target analysis unit, and a rack on which the standard solution required for the analytical measurement and the quality control sample required for the quality control sample measurement are placed is put in the automatic analyzer and analyzed, so that the analysis unit that has been cleaned by the wash rack can be used.

However, it is the user's burden to carry out all the above preparations.

Therefore, in Example 5, when the calibration rack and the quality control rack are continuously transported to the automatic analyzer in the stated order subsequently to the wash rack, the calibration analysis request and the quality control measurement request are automatically generated for all the items that can be analyzed by the analysis unit to which the cleaning rack is transported and to be cleaned.

FIG. 12 is a diagram showing a processing flow for automatically generating the calibration analysis request and the quality control measurement request for all items that can be analyzed by the analysis unit.

In Step 1001 of FIG. 12, the user installs the wash rack to the sample rack roading unit 1 so that the automatic analyzer is loaded into the automatic analyzer.

In Step 1002, the calibration rack and the quality control rack are loaded into the sample rack loading unit 1 of the automatic analyzer by the user. Subsequently, in Step 1003, the overall management computer 11 determines whether or not the calibration rack and the quality control rack are continuously carried in next to the wash rack.

If it is determined in Step 1003 that the calibration rack and the quality control rack have been continuously carried in next to the wash rack, the overall management computer 11 automatically generates the analysis request and the quality control request for the items that can be analyzed by the analysis unit in which the wash rack has performed the cleaning operation in Step 1004.

After that, cleaning, the calibration analysis, and the quality control measurement are performed by the same operation as in Example 1.

If it is determined in Step 1003 that the calibration rack and the quality control rack are not continuously carried into the wash rack, that is, if the operation of Step 1002 is not performed, the operation of Step 1004 is not performed, and the process is completed.

According to Example 5 described above, the user only continuously installs the calibration rack in which the necessary standard solution is installed and the quality control sample rack in which the quality control sample is installed in the wash rack, and carries out the rack transportation into the automatic analyzer, so that the user does not need to make a calibration analysis request and a quality control request for items that can be analyzed by the analysis unit in which the wash rack performs the cleaning operation, and the cleaning, the calibration analysis, and the quality control measurement are performed.

Therefore, according to Example 5, the same effects as those of Example 1 can be obtained, the processing performed by the user can be reduced, and the convenience can be improved.

When the automatic analyzer includes multiple analysis units of different types, for example, an electrolyte analysis unit, a biochemical analysis unit, and an immunoassay unit, the wash rack is provided for each type of the analysis units, and an identification code or the like is attached to the wash unit. Then, the identification code attached to the wash rack can be read by the ID reading unit 2 and transported to the corresponding analysis unit.

Further, when the cleaning liquid installed on the wash rack can be commonly used for cleaning different types of the analysis units, the present wash rack can be transported to the multiple analysis units. In that case, the present wash rack may be configured to be transported in order from the analysis unit disposed at a position closer to the sample rack loading port 1.

Further, the above-mentioned examples are examples including the multiple analysis units, but Examples 1, 2, and 5 is applicable even if there is only one analysis unit.

Further, in the above-described examples, the calibration rack for holding the standard solution and the accuracy control rack for holding the quality control sample are loaded from the sample rack loading unit 1 and transported to the analysis unit. However, the present invention is applicable even when the standard solution and the quality control sample are prepared in advance. In that case, the transportation of the calibration rack and the quality control rack to the analysis unit can be omitted.

LIST OF REFERENCE SIGNS

1 . . . sample rack loading unit, 2 . . . ID reading unit, 3 . . . transportation line (transportation mechanism), 5, 6, 7, 8 . . . analysis unit, 9 . . . sample rack standby unit, 10 . . . sample rack recovery unit, 11 . . . computer for overall management, 12, 13, 14, 15, 16 . . . control computer, 18 . . . operation unit, 19 . . . display unit, 20, 21, 22, 23 . . . reagent dispensing probe, 25, 26 . . . rail, 30, 31 . . . stirring device, 35 . . . reaction container, 36 . . . reaction disk, 40 . . . reagent container, 41, 42 . . . reagent disk, 45 . . . container cleaning mechanism, 50 . . . light source, 51, 61, 71, 81 . . . retraction line (retraction mechanism), 52 . . . detection optical device, 54 . . . cleaning port, 60 . . . controller, 62 . . . case, 91 . . . sample container, 92 . . . sample rack, 34, 95, 103 . . . sample dispensing probe, 100 . . . analysis unit, 104 . . . dilution tank, 201 to 208, 301 to 306, 401 to 404, 601 to 606, 801 to 805, 901 to 907, 1001 to 1004 . . . processing step, 501 . . . implementation period setting unit, 502, 702 . . . registration button, 503, 703 . . . cancel button, 701 . . . implementation measurement test number setting unit

The invention claimed is:

1. An automatic analyzer comprising:
at least one analysis unit that analyzes a sample;
a rack loading unit into which at least a sample rack that holds the sample, a wash rack that holds a cleaning liquid, a calibration rack that holds a standard solution, and a quality control rack that holds a quality control material are loaded;
a transportation mechanism that transports at least the sample rack and the wash rack from the rack loading unit to an analysis unit; and
an overall management control unit that controls operations of the analysis unit, the rack loading unit, and the transportation mechanism,
wherein the overall management control unit is configured to:
cause the wash rack to be transported to the analysis unit,
cause the analysis unit to execute a cleaning operation of the analysis unit using the cleaning liquid held by the wash rack,
after completion of the cleaning operation, cause the calibration rack to be transported to the analysis unit,
cause the analysis unit to execute a calibration using the standard solution,
cause the quality control rack to be transported to the analysis unit,
cause the analysis unit to execute a quality control operation by measuring the quality control material to obtain a measurement result value,
determine whether the measurement result value is within a predetermined range and upon determining the measurement value is not within the predetermined range, stop sample analysis operation of the analysis unit and repeat the cleaning operation and the quality control operation until the measurement value is within the predetermined range thereby determining that a performance of the analysis unit is normal.

2. The automatic analyzer according to claim 1,
wherein the calibration rack and the quality control rack are transported to the analysis unit via the transportation mechanism.

3. The automatic analyzer according to claim 2,
wherein the overall management control unit is configured to:
store an execution time of the cleaning operation of the analysis unit, and
after an elapse of a predetermined time from the execution time, stop the sample analysis operation of the analysis unit until the analysis unit performs the cleaning operation.

4. The automatic analyzer according to claim 3, further comprising a display coupled to the overall management control unit,
wherein the overall management control unit is configured to cause the display unit to display information indicating that the analysis unit is required to be subjected to the cleaning operation.

5. The automatic analyzer according to claim 3, further comprising a display coupled to the overall management control unit,
wherein the overall management control unit is configured to cause the display to display information indicating that the analysis unit is required to be subjected to the cleaning operation at a predetermined period before a time point when the analysis unit is required to be subjected to the cleaning operation.

6. The automatic analyzer according to claim 2,
wherein the overall management control unit is configured to:
store a number of analyses of the sample by the analysis unit, and
stop the sample analysis operation by the analysis unit until the analysis unit performs the cleaning operation after the stored number of analyses have reached a predetermined number.

7. The automatic analyzer according to claim 2,
wherein the overall management control unit is configured to:
cause the wash rack loaded in the rack loading unit to be held in the rack loading unit while the analysis unit to be cleaned completes the analysis of the sample before causing
the wash rack to be transported to the analysis unit to be cleaned.

8. The automatic analyzer according to claim 2, wherein the at least one analysis unit comprises a plurality of analysis units and wherein the overall management control unit is configured to: cause the cleaning operation, calibration and the quality control operation at each analysis unit of the plurality of analysis units.

9. The automatic analyzer according to claim 2,
wherein the overall management control unit is configured to: create a calibration request and a quality control sample measurement request for all items capable of being analyzed by the analysis unit subjected to the cleaning operation, and
perform the calibration and quality control sample measurement by the analysis unit subjected to the cleaning operation.

10. The automatic analyzer according to claim 1,
wherein the analysis unit is a biochemical analysis unit, which includes:
a reaction container; and
a sample dispensing probe, and
wherein, the overall management control unit is configured to, during the cleaning operation, cause the sample dispensing probe to suction the cleaning liquid and dispense the cleaning liquid into the reaction container.

11. The automatic analyzer according to claim 1,
wherein the analysis unit is an electrolyte analysis unit, which includes:
a sample dispensing probe; and
a dilution tank, and
wherein the overall management control unit is configured to, during the cleaning operation, cause the sample dispensing probe to suction the cleaning liquid and dispense the cleaning liquid into the dilution tank.

* * * * *